United States Patent Office 2,877,239
Patented Mar. 10, 1959

2,877,239

ANABOLIC AGENTS

Eugene J. Agnello and Gerald D. Laubach, Jackson Heights, N. Y., assignors to Chas. Pfizer & Co., Inc., New York, N. Y., a corporation of Delaware No Drawing. Application April 30, 1957
Serial No. 655,951

2 Claims. (Cl. 260—397.4)

This invention relates to new and useful anabolic agents and to compositions containing them. More particularly, it relates to certain $\Delta^{1,4,6}$-derivatives of androstene and to compositions of these compounds with pharmaceutical excipients.

The useful compounds of this invention are represented by the formula:

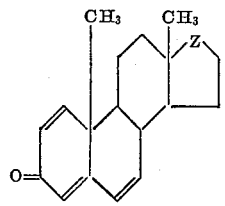

wherein Z is

or

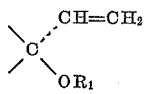

$R_1$ is hydrogen or an acyl hydrocarbon containing up to ten carbon atoms; and Alk is an alkyl group containing up to four carbon atoms.

A suitable starting material for the preparation of the compounds of this invention is the well known compound $\Delta^4$-androstene-3,17-dione which is readily prepared by chromic acid oxidation of testosterone.

The substituents, here represented by Z, can be introduced at the 17-position by procedures well known in the art. For example, treatment of the starting compound with an organo-metallic compound of the type RLi or RMgX, wherein R is an alkyl group of the preferred size and X is a halogen atom, forms α-hydroxyl-β-alkyl substituents at the 17-position. The vinyl group can be placed at the 17-position by treating the 17-keto compound with acetylene in the presence of a potassium tert-alkoxide (for instance, potassium tert-amyl oxide) and reducing the thus produced ethynyl group by catalytic hydrogenation. While these conversions are being carried out, the 3-keto group of the original starting compound is preferentially converted to a pyrrolidinyl derivative. After the conversions are complete, the pyrrolidinyl group is removed by refluxing the compound in a sodium acetate-acetic acid buffered aqueous-methanol solution. This reaction is described in detail by Heyl and Herr in the Journal of The American Chemical Society, vol. 75, page 1918.

An hydroxyl group at the 17-position can be esterified by refluxing in a liquid anhydride, for example, acetic or propionic anhydride. With solid anhydrides, the esterification is best accomplished by heating the compound at about 100° C. in a hydrocarbon solvent solution (for example, xylene) which contains the anhydride and cata- lytic amounts of potassium acetate. Esters and acid esters of the 17-hydroxyl group can be obtained in this manner. These procedures are conventional for the preparation of esters of tertiary alcohols, and have been described in numerous articles in the chemical literature.

The compounds of the instant invention are prepared from the above described starting materials by the action of selenium dioxide and a quinone as described in earlier filed patent applications, Serial No. 605,479, filed August 8, 1956, Serial No. 526,786, filed August 5, 1955 (selenium dioxide), Serial No. 526,554, filed August 4, 1955, and Serial No. 633,538, filed January 10, 1957 (quinone).

In the first two of these applications a method is described whereby a double bond can be introduced at the 1(2)-position of a $\Delta^4$-3-keto steroid by contacting it with selenium dioxide in an inert organic solvent at an elevated temperature. Solvents which are useful for this reaction include, for example, tert-butanol, tert-pentanol, benzene, ethylene glycol diethers, such as dibutyl cellosolve; dipropyl ether; ethylene glycol and various other glycol ethers; phenetole; xylene; dioxane; naphthalene and others. Preferred conditions include the addition of a lower aliphatic acid, particularly acetic acid to a tert-butanol mixture. In carrying out the reaction it is generally preferred to utilize temperatures of from about 75° C. to about 200° C. for from about one hour to about one hundred hours. Generally several molecular proportions of selenium dioxide are added during the reaction period. The application of this reaction to the preparation of the valuable compounds of the instant invention is more fully illustrated in the appended examples.

In the latter two of these earlier filed patent applications a method is described for the introduction of double bonds into the 6(7)-position by dehydrogenation of a 3-keto-6-dihydro-$\Delta^4$-steroid compound with a quinone having an oxidation-reduction potential less than —0.5 at a temperature of between 70° C. and 190° C. in an inert organic solvent having a boiling point of at least about 70° C. These solvents include mono-nuclear aromatic hydrocarbons, mono-nuclear halogenated aromatic hydrocarbon solvents, oxygenated polar alicyclic organic solvents and oxygenated polar aliphatic organic solvents. Typical solvents include tertiary butanol, n-amyl alcohol, hexanol, isoamyl alcohol, heptanol-3, cyclohexanol, ortho-dichlorobenzene, xylene, tertiary amyl alcohol, secondary amyl alcohol, benzene, toluene, acetic acid, propionic acid, butyric acid, butyl acetate, amyl acetate, hexyl acetate, butyl propionate, propyl propionate, and amyl propionate. The preparation of the valuable compounds of the instant invention using the process described in the earlier filed applications is more fully illustrated in the appended examples.

Although the reactions with selenium dioxide or a quinone described above are applicable to compounds in which the 17-position carries a free β-hydroxyl group, for optimum results it is best that this hydroxyl group be acylated with an acyl hydrocarbon group containing up to ten carbon atoms. The term, "acyl hydrocarbon" includes acyl hydrocarbon groups containing only carbon, hydrogen and oxygen derived from monocarboxylic or dicarboxylic acids. In the event that the acyl hydrocarbon group is one derived from a dicarboxylic acid, it is often advantageous to treat the isolated anabolically active compounds with a base derived from an alkali metal or alkaline earth metal to prepare a metal salt. These bases include, for example, sodium, potassium, barium and calcium hydroxide as well as the corresponding carbonates and bicarbonates. Products so prepared are especially useful because of their increased solubility in water.

It is immaterial which of the two above described reactions is utilized first in the preparation of the valuable compounds of the instant invention. Thus oxidation with selenium dioxide may be used to prepare $\Delta^{1,4}$-compounds and these converted to $\Delta^{1,4,6}$-compounds by the action of a quinone. Alternatively, a $\Delta^{4,6}$-compound can be prepared by the action of a quinone and converted to a $\Delta^{1,4,6}$-compound by the action of selenium dioxide. Both of these methods of synthesis are illustrated in the appended examples and a more complete description of the reactions is available by reference to the above described patent applications. The $\Delta^{4,6}$-compounds prepared by the action of a quinone are new compounds which are more fully described and claimed in copending and concurrently filed patent application, Serial No. 655,952, filed April 30, 1957, and now abandoned.

The products of this invention, as stated above, are valuable medicinally as anabolic agents, that is, they aid at rebuilding human tissue injured by surgery or depleted by serious illness. When used in the treatment of these conditions the compounds of this invention are administered in dosages of approximately the same order of magnitude as other agents often recommended for these purposes such as 17α-ethyl-17-hydroxy-norandrosterone, 11β,17β-hydroxy-9α-fluoro-17α-methyl-4-androstene-3-one or 11β,17β-dihydroxy-17α-methyl-4-androstene-3-one. Because of their high order of activity, it is sometimes possible to use dosages of the compounds of this invention which are lower than compounds presently utilized. They accomplish their valuable therapeutic effect with a minimum of undesirable androgenic activity. For this reason, and because they are effective at relatively low levels, they can be administered for extended periods of time to patients of either sex.

The biologically active compounds of this invention may be administered alone or in combination with acceptable pharmaceutical carriers, the choice of which is determined by the preferred route of administration, the solubility of the compound and standard pharmaceutical practice. For oral administration the compounds may be administered in the form of tablets containing excipients such as starch or milk sugar. Aqueous solutions and elixirs which may be sweetened or flavored may also be used. For intra-articular injection aqueous suspensions may be employed. In this case various suspending and wetting agents may be added to the composition to obtain a suspension not tending to settle out easily or to pack down in the bottle in which it is stored. Intramuscular and subcutaneous dosage forms may also be prepared by standard pharmaceutical practice.

The following examples are given solely for the purpose of illustration and are not to be construed as limitations of this invention, many apparent variations of which are possible without departing from the spirit or scope thereof.

This application is a continuation-in-part of earlier filed patent applications, Serial No. 526,554, filed August 4, 1955, and Serial No. 633,538, filed January 10, 1957.

EXAMPLE I $\Delta^{1,4,6}$-androstatriene-17α-methyl-17β-ol 17-acetate

A mixture of $\Delta^4$-androstene-17α-methyl-17α-ol 17-acetate (0.3 g.) and 0.1 g. of selenium dioxide was refluxed in 25 ml. of glacial acetic acid. The mixture was refluxed for two hours and a further 0.1 g. of selenium dioxide was added. Refluxing was continued for three hours and the reaction mixture filtered through a diatomaceous earth filteraid. The solvent and acetic acid were then removed by evaporation in vacuo. The product obtained in this manner was identified as $\Delta^{1,4}$-androstadiene-17α-methyl-17β-ol 17-acetate.

A mixture containing 0.4 g. of the above compound and 0.7 g. of chloranil in 35 ml. of n-amyl alcohol was refluxed under nitrogen with stirring for three hours. It was concentrated to 5 ml. on a hot plate and the solution taken up in 30 ml. of chloroform. It was washed twice with 25 ml. portions of water, four times with 25 ml. portions of 5% aqueous sodium hydroxide and four additional times with 25 ml. portions of water. The mixture was dried over anhydrous sodium sulfate, filtered and concentrated to dryness in vacuo. The residue was triturated with 1:1 ether-ethyl acetate to give the desired product.

The process was repeated on the non-acylated compound to prepare $\Delta^{1,4,6}$-androstatriene-17α-methyl-17β-ol, but in somewhat decreased yields.

EXAMPLE II $\Delta^{1,4,6}$-androstatriene-17α-n-butyl-17β-ol 17-valerate

The procedure of Example I was repeated using $\Delta^4$-androstene-17α-n-butyl-17β-ol 17-valerate as the starting material and the desired compound isolated.

EXAMPLE III $\Delta^{1,4,6}$-androstatriene-17α-vinyl-17β-ol 17-propionate

A mixture of 0.4 g. of $\Delta^4$-androstene-17α-vinyl-17β-ol 17-propionate and 0.5 g. of chloranil in 35 ml. of ortho-dichlorobenzene was refluxed in a nitrogen atmosphere for eighteen hours. The solvent was removed in vacuo and the residue taken up in 20 ml. of chloroform. The chloroform solution was washed with several small portions of 5% aqueous sodium hydroxide and then with water. It was dried over anhydrous sodium sulfate, filtered and concentrated in vacuo. The residue was triturated in ether and dried in vacuo to obtain $\Delta^{4,6}$-androstadiene-17α-vinyl-17β-ol 17-propionate.

A mixture containing 0.3 g. of the above product and 0.3 ml. of glacial acetic acid in 30 ml. of tert-butanol was prepared. To this mixture, there was added 0.2 g. of selenium dioxide and the mixture was refluxed in a nitrogen atmosphere for three hours. An additional 0.1 g. of selenium dioxide was added and refluxing was continued for four more hours. The mixture was filtered and the filtrate evaporated to dryness in vacuo. The residue was taken up in 25 ml. of ethyl acetate and washed with one 5 ml. portion of water, twice with 5 ml. portions of 5% aqueous potassium bicarbonate, once with 5 ml. of water, twice with 5 ml. portions of ice cold 15% ammonium sulfide, once with 5 ml. of cold 2N ammonium hydroxide, once with 5 ml. of water, once with 5 ml. of 2 N hydrochloric acid and finally twice with 5 ml. portions of water. The layers were separated and the organic layer dried over anhydrous sodium sulfate, filtered and evaporated to dryness in vacuo. The residue was triturated in ether and dried in vacuo to obtain the desired product.

The procedure of Example I was used to prepare the following compounds. The list is given to avoid needless repetition of experimental details.

$\Delta^{1,4,6}$-androstatriene-17α-ethyl-17β-ol 17-acetate.
$\Delta^{1,4,6}$-androstatriene-17α-ethyl-17β-ol 17-propionate.
$\Delta^{1,4,6}$-androstratriene-17α-n-propyl-17β-ol 17-acetate.
$\Delta^{1,4,6}$-androstatriene-17α-isopropyl-17β-ol 17-propionate.

EXAMPLE IV

The free 17-alcohols of the 17-esters prepared as in the previous examples were each prepared by hydrolysis of the ester by addition of one molar portion of potassium carbonate in 10% aqueous-methanol solution of the ester. The mixture was allowed to stand at room temperature for one hour and then poured into ice water to precipitate the free alcohols.

EXAMPLE V

A variety of esters of the 17-alcohols synthesized in the previous examples were prepared by treating each of the free alcohols with acylating agents by conventional methods. These included such compounds as the formate, the acetate, the propionate, the isobutyrate, the hexanoate, the benzoate, the octanoate, the stearate, the hemisuccinate, the trimethyl acetate, the cyclohexane carbamate, the cyclohexyl benzoate, the cyclopentyl propionate, etc. The acid esters of polycarboxylic esters such as the hemisuccinate have the advantage that the alkali metal or alkaline earth metal salts can be prepared from them by treating with molar proportions of a base such as sodium bicarbonate or calcium hydroxide. These salts, in addition to being biologically active, have the advantage of being more soluble in water than the free alcohols themselves or the ordinary esters thereof.

What is claimed is:

1. A compound selected from the group consisting of those having the formula:

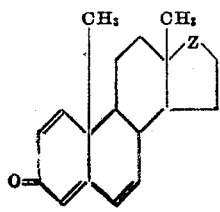

wherein Z is selected from the group consisting of

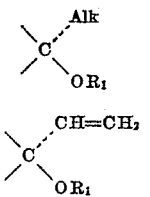

and $R_1$ is selected from the group consisting of hydrogen and acyl hydrocarbon containing up to ten carbon atoms; and Alk is selected from the group consisting of alkyl groups containing up to four carbon atoms.

2. A pharmaceutical composition comprising a compound as claimed in claim 1 together with a pharmaceutically acceptable carrier.

References Cited in the file of this patent
UNITED STATES PATENTS

| | | |
|---|---|---|
| 2,739,974 | Colton | Mar. 27, 1956 |
| 2,756,179 | Fried | July 24, 1956 |